(12) United States Patent
Corey et al.

(10) Patent No.: US 12,040,584 B2
(45) Date of Patent: Jul. 16, 2024

(54) OPTICAL SYSTEM FOR USE WITH A VACUUM CHAMBER AND ASSOCIATED METHOD

(71) Applicant: Eagle Technology, LLC, Melbourne, FL (US)

(72) Inventors: Christopher A. Corey, Palm Bay, FL (US); Abigail S. Nunez, Palm Bay, FL (US); Michael R. Lange, Melbourne, FL (US)

(73) Assignee: EAGLE TECHNOLOGY, LLC, Melbourne, FL (US)

( * ) Notice: Subject to any disclaimer, the term of this patent is extended or adjusted under 35 U.S.C. 154(b) by 0 days.

(21) Appl. No.: 17/545,417

(22) Filed: Dec. 8, 2021

(65) Prior Publication Data

US 2023/0178952 A1 Jun. 8, 2023

(51) Int. Cl.
*H01S 3/00* (2006.01)
*G02B 6/42* (2006.01)

(52) U.S. Cl.
CPC ............ *H01S 3/005* (2013.01); *G02B 6/4296* (2013.01)

(58) Field of Classification Search
CPC .............................. H01S 3/005; G02B 6/4296
See application file for complete search history.

(56) References Cited

U.S. PATENT DOCUMENTS

| | | | |
|---|---|---|---|
| 3,262,360 A * | 7/1966 | Gruner | G01C 11/00 359/822 |
| 4,099,852 A | 7/1978 | Kobierecki et al. | |
| 4,922,159 A * | 5/1990 | Phillips | F16F 7/1011 73/514.24 |
| 4,972,155 A * | 11/1990 | Funk | G01N 27/223 324/689 |
| 5,083,757 A | 1/1992 | Barsky | |
| 5,240,457 A * | 8/1993 | Leichliter | F16F 15/161 192/208 |

(Continued)

FOREIGN PATENT DOCUMENTS

| | | |
|---|---|---|
| CN | 107765391 | 3/2018 |
| CN | 207650474 | 7/2018 |

(Continued)

OTHER PUBLICATIONS

Beguin, Lucas. Measurement of the van der Waals interaction between two Rydberg atoms. Institut d'Optique Graduate School, 2013. (Year: 2013).*

(Continued)

*Primary Examiner* — Peter Radkowski
(74) *Attorney, Agent, or Firm* — ALLEN, DYER, DOPPELT, + GILCHRIST, P.A.

(57) ABSTRACT

An optical system for use with a vacuum chamber may include a target to be positioned within the vacuum chamber, a laser source, and an optical assembly to be positioned within the vacuum chamber between the target and the laser source. The optical assembly may include a housing, a frame, a lens carried by the frame, and spiral flexures each having a respective proximal end coupled to the frame. In addition, the optical assembly may include a plurality of flexure actuators, where each flexure actuator is coupled between the housing and a distal end of a respective spiral flexure.

10 Claims, 5 Drawing Sheets

(56) References Cited

U.S. PATENT DOCUMENTS

| | | | | |
|---|---|---|---|---|
| 5,492,313 A * | 2/1996 | Pan | | F16F 1/025 60/520 |
| 5,522,214 A * | 6/1996 | Beckett | | F02G 1/053 92/84 |
| 5,986,827 A * | 11/1999 | Hale | | G02B 7/004 359/822 |
| 6,129,527 A * | 10/2000 | Donahoe | | F04B 35/045 417/418 |
| 6,141,300 A * | 10/2000 | Getreuer | | G11B 7/08582 369/44.14 |
| 6,144,118 A * | 11/2000 | Cahill | | H02K 41/031 318/135 |
| 6,160,768 A * | 12/2000 | Yanagawa | | G11B 7/0933 |
| 6,378,964 B2 | 4/2002 | Young et al. | | |
| 6,603,531 B1 * | 8/2003 | Binnard | | G03F 7/70766 355/75 |
| 6,806,991 B1 | 10/2004 | Sarkar et al. | | |
| 6,813,225 B2 * | 11/2004 | Widdowson | | G02B 7/08 369/44.14 |
| 6,885,116 B2 * | 4/2005 | Knirck | | H04R 23/008 359/260 |
| 6,891,601 B2 * | 5/2005 | Jeanne | | G03F 7/70716 318/135 |
| 7,170,589 B2 * | 1/2007 | Cherala | | G03B 27/58 355/72 |
| 7,266,272 B1 | 9/2007 | Calvet et al. | | |
| 7,270,319 B2 | 9/2007 | Culpepper | | |
| 7,298,456 B2 * | 11/2007 | Cherala | | G03F 7/0002 355/72 |
| 7,420,654 B2 * | 9/2008 | Cherala | | B82Y 10/00 355/72 |
| 7,495,838 B2 * | 2/2009 | Krneta | | G02B 19/0014 359/813 |
| 7,550,880 B1 * | 6/2009 | Pusl | | H02K 33/06 310/15 |
| 7,586,701 B2 * | 9/2009 | Kim | | G02B 7/08 359/814 |
| 7,623,159 B2 * | 11/2009 | Wada | | G03B 17/00 348/222.1 |
| 7,633,190 B2 * | 12/2009 | Liu | | H02K 41/0356 310/15 |
| 8,016,277 B2 | 9/2011 | Choi et al. | | |
| 8,254,045 B1 * | 8/2012 | Benner, Jr. | | H02K 41/0356 359/824 |
| 8,283,837 B2 * | 10/2012 | Ashizawa | | H10N 30/505 310/323.02 |
| 8,488,260 B2 | 7/2013 | Calvet et al. | | |
| 9,057,425 B2 * | 6/2015 | Hendershott | | F16M 11/043 |
| 9,134,503 B2 | 9/2015 | Topliss | | |
| 9,531,926 B2 * | 12/2016 | Lee | | H04N 23/54 |
| 9,599,838 B2 * | 3/2017 | Park | | G02B 7/04 |
| 9,739,354 B2 * | 8/2017 | Hendershott | | F16H 21/12 |
| 9,740,020 B2 * | 8/2017 | Park | | G03B 3/10 |
| 9,781,345 B1 * | 10/2017 | Miller | | G02B 7/09 |
| 9,958,710 B1 | 5/2018 | Morse et al. | | |
| 9,958,711 B1 | 5/2018 | Morse et al. | | |
| 10,001,658 B2 * | 6/2018 | Park | | G03B 3/10 |
| 10,216,000 B2 * | 2/2019 | Park | | G02B 27/646 |
| 10,254,017 B2 | 4/2019 | Champagne | | |
| 10,466,516 B2 | 11/2019 | Morse et al. | | |
| 10,469,752 B2 * | 11/2019 | Maede | | H04N 23/687 |
| 10,495,943 B2 | 12/2019 | Wasilousky et al. | | |
| 10,509,245 B2 | 12/2019 | Morse et al. | | |
| 10,754,223 B2 | 8/2020 | Morse et al. | | |
| 11,016,264 B2 * | 5/2021 | Tseng | | G02B 27/646 |
| 11,156,851 B2 * | 10/2021 | Park | | G02B 7/08 |
| 11,281,019 B2 * | 3/2022 | Otomo | | G03B 5/02 |
| 11,454,992 B1 * | 9/2022 | Smith | | G02B 7/10 |
| 2003/0035349 A1 * | 2/2003 | Widdowson | | G02B 7/08 369/44.14 |
| 2004/0174076 A1 * | 9/2004 | Knirck | | H04R 23/008 310/12.04 |
| 2005/0012920 A1 * | 1/2005 | Jeanne | | G03F 7/70758 318/135 |
| 2005/0269745 A1 * | 12/2005 | Cherala | | B82Y 40/00 264/320 |
| 2005/0280314 A1 * | 12/2005 | Jeanne | | G03F 7/70716 310/10 |
| 2006/0001194 A1 * | 1/2006 | Cherala | | G03B 27/58 264/320 |
| 2006/0001857 A1 * | 1/2006 | Cherala | | G03B 27/58 355/72 |
| 2006/0001886 A1 | 1/2006 | Zacharie et al. | | |
| 2006/0033818 A1 * | 2/2006 | Wada | | H04N 23/687 348/208.11 |
| 2006/0138904 A1 * | 6/2006 | Chu | | H02N 2/028 310/328 |
| 2006/0289783 A1 * | 12/2006 | Quarre | | G02B 21/26 250/440.11 |
| 2007/0137740 A1 * | 6/2007 | Johnson | | A61L 31/022 148/563 |
| 2007/0206252 A1 * | 9/2007 | Sissom | | F16C 11/12 |
| 2008/0019011 A1 * | 1/2008 | Krneta | | H01S 5/14 359/641 |
| 2008/0144200 A1 * | 6/2008 | Kim | | G02B 7/08 359/824 |
| 2009/0001852 A1 * | 1/2009 | Ashizawa | | H02N 2/023 29/25.35 |
| 2010/0062694 A1 * | 3/2010 | Yi | | B24B 37/32 451/286 |
| 2012/0314308 A1 * | 12/2012 | Ikushima | | G02B 27/646 359/814 |
| 2013/0039640 A1 * | 2/2013 | Sekimoto | | H04N 23/57 396/55 |
| 2013/0077168 A1 | 3/2013 | Gutierrez et al. | | |
| 2013/0176628 A1 * | 7/2013 | Batchko | | G02B 3/12 359/665 |
| 2014/0123786 A1 * | 5/2014 | Hendershott | | F16M 11/12 74/69 |
| 2014/0327965 A1 * | 11/2014 | Chen | | H04N 23/687 359/557 |
| 2014/0333785 A1 * | 11/2014 | Lee | | G02B 27/646 348/208.6 |
| 2015/0043095 A1 | 2/2015 | Lipton et al. | | |
| 2015/0212336 A1 * | 7/2015 | Hubert | | H04N 23/55 359/554 |
| 2015/0247560 A1 * | 9/2015 | Hendershott | | F16M 11/043 74/110 |
| 2015/0350497 A1 * | 12/2015 | Gamadia | | H04N 23/58 348/373 |
| 2016/0147035 A1 * | 5/2016 | Lee | | H02N 2/101 359/824 |
| 2016/0216529 A1 * | 7/2016 | Park | | H04N 23/687 |
| 2016/0231528 A1 * | 8/2016 | Wong | | G03B 5/00 |
| 2017/0094187 A1 * | 3/2017 | Sharma | | G03B 5/02 |
| 2017/0108785 A1 * | 4/2017 | Aoki | | G03F 7/70816 |
| 2017/0285361 A1 * | 10/2017 | Ito | | G02B 27/646 |
| 2018/0173027 A1 | 6/2018 | Morse et al. | | |
| 2018/0203265 A1 | 7/2018 | Morse et al. | | |
| 2018/0203325 A1 | 7/2018 | Wasilousky et al. | | |
| 2018/0299745 A1 | 10/2018 | Morse et al. | | |
| 2019/0155047 A1 * | 5/2019 | Park | | G02B 27/646 |
| 2020/0249469 A1 | 8/2020 | Raab et al. | | |
| 2021/0055501 A1 | 2/2021 | Corey et al. | | |

FOREIGN PATENT DOCUMENTS

| | | | | |
|---|---|---|---|---|
| EP | 0140951 B1 * | 4/1989 | | |
| EP | 0179426 | 10/1991 | | |
| JP | 2000337439 A * | 12/2000 | | F16F 15/02 |
| JP | 5350285 | 8/2013 | | |
| KR | 20130060534 A * | 6/2013 | | |
| WO | WO-03065120 A2 * | 8/2003 | | B29C 33/10 |
| WO | WO2007034174 | 3/2007 | | |

OTHER PUBLICATIONS

Chen et al., Nonlinear static modeling of a tip-tilt-piston micropositioning stage comprising leaf-spring flexure hinges, Proceedings of the

(56) References Cited

OTHER PUBLICATIONS

Institution of Mechanical Engineers, Part C: Journal of Mechanical Engineering Science 2020 234:10, 1969-1978 (Year: 2020).*
Qiu et al., Constraint-Based Design and Analysis of a Compliant Parallel Mechanism Using SMA-Spring Actuators, Proceedings of the ASME 2014 International Design Engineering Technical Conferences and Computers and Information in Engineering Conference. vol. 5A: (Year: 2014).*
Excerpts from Chase, Kenneth & Gao, Jinsong & Magleby, Spencer & Sorensen, Carl. (2000). Including Geometric Feature Variations in Tolerance Analysis of Mechanical Assemblies. IIE Transactions (Institute of Industrial Engineers). 28. 10.1080/15458830.1996. 11770732. (Year: 2000).*
Excerpts from http://ecoursesonline.iasri.res.in/mod/page/view.php?id=1305 (Year: 2014).*
Lee et al., Design Optimization of Flexure Springs for Free-Piston Stirling Engines and Experimental Evaluations with Fatigue Testing. Energies 2021, 14, 5156. https://doi.org/10.3390/en14165156 (published Aug. 20, 2021) (Year: 2021).*
Li et al., Synchronization of Two Eccentric Rotors Driven by One Motor with Two Flexible Couplings in a Spatial Vibration System, Mathematical Problems in Engineering vol. 2019, Article ID 2969687, 13 pages https://doi.org/10.1155/2019/2969687 (Year: 2019).*
English language translation of EP-0140951-B1 (Year: 1989).*
English language translation of JP-2000337439-A (Year: 2000).*
English language translation of WO-03065120-A2 (Year: 2003).*
English language translation of KR-20130060534-A (Year: 2013).*
James P. Sharkey, Darryl C. W. Foo, Alexandre Kabla, Jeremy J. Baumberg, Richard W. Bowman; A one-piece 3D printed flexure translation stage for open-source microscopy. Rev. Sci. Instrum. Feb. 1, 2016; 87 (2): 025104. https://doi.org/10.1063/1.4941068 (Year: 2016).*

* cited by examiner

OPTICAL SYSTEM FOR USE WITH A VACUUM CHAMBER AND ASSOCIATED METHOD

FIELD

The present invention relates to the field of optical, assemblies, and, more particularly, to an optical system for use, with a vacuum chamber an associated method.

BACKGROUND

Ion trap quantum computing uses highly precise alignment of the final "atom imager" objective lens. For example, this may include thirty-two telecentric beams targeting an array of thirty-two individual atoms. The location in all three axes (x, y, z) is desirably controlled to within <50 um, for example. In addition, the beam angle in the x and y direction (pitch and yaw) may be controlled within 10 mrad.

System architecture often means that these beams travel horizontally to skim the top of the ion trap. A relatively small (e.g., 4.5 um) spot size uses a relatively high numerical aperture (NA) objective lens. Further, there may be significant restriction of physical space for the mechanism typically used to adjust the alignment.

Previous systems attempted to address these problems by using a Gough-Stewart Platform (hexapod) mounted outside, the vacuum chamber. Beams were directed to enter the vacuum chamber from below using a relatively large reentrant window. The vertical beam orientation may be desirable to eliminate the overhanging loads (moments) and to center the center of gravity of the lens above the manipulator.

Despite the existence of such configurations, further advancements in optical systems may be desirable in certain applications, such as quantum computing, for example.

SUMMARY

An optical system for use with a vacuum chamber may include a target to be positioned within the vacuum chamber, a laser source, and an optical assembly to be positioned within the vacuum chamber between the target and the laser source. The optical assembly may include a housing, a frame, a lens carried by the frame, and a plurality of spiral flexures each having a respective proximal end coupled to the frame. In addition, the optical assembly may include a plurality of flexure actuators, where each flexure actuator is coupled between the housing and a distal end of a respective spiral flexure.

The optical assembly may comprise a respective threaded flexure tube coupled to a distal end of each of the plurality of spiral flexures. Each flexure actuator may comprise a motor having a rotatable threaded output shaft coupled to a respective threaded flexure tube. In some embodiments, the flexure actuators may be carried within the housing.

The optical assembly may also comprise a plurality of translation actuators coupled between the housing and the frame. For example, the flexure actuators and the translation actuators may be configured to provide five degrees of freedom (DOF) movement for adjustment of the lens.

The frame may include a pair of elongate passageways orthogonal to one another. Each translation actuator may comprise a motor having an eccentric output shaft received within a respective elongate passageway. Similar to the flexure actuators, the plurality of translation actuators may also be carried within the housing.

The frame may have a rectangular shape defining four corners, for example. In this embodiment, the proximal end of each spiral flexure is coupled to the frame at a respective corner.

In some embodiments, the target may comprise an atom trap. In other embodiments, the target may comprise a semiconductor mask. Of course, the optical assembly may be used in other applications as well.

A method aspect is directed to a method of steering a laser beam from a laser source to a target within a vacuum chamber. The method may include operating a plurality of flexure actuators of an optical assembly within the vacuum chamber between the target and the laser source. The optical assembly may comprise a housing, a frame, a lens carried by the frame, and a plurality of spiral flexures each having a respective proximal end coupled to the frame. The optical assembly also comprises the plurality of flexure actuators, with each flexure actuator coupled between the housing and a distal end of a respective spiral flexure.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Ion trap quantum computing requires highly precise alignment of the final "atom imager" objective lens of an optical assembly. There is a desire to move away from re-entrant windows in large vacuum chambers and toward more compact, highly integrated designs having the objective lens inside the vacuum chamber. Thus, minimizing chamber size may be critical to system performance. The optical assembly may need to be as small as possible as operation inside the vacuum chamber would typically use remote operation of the lens mount adjustments.

Figure 1:
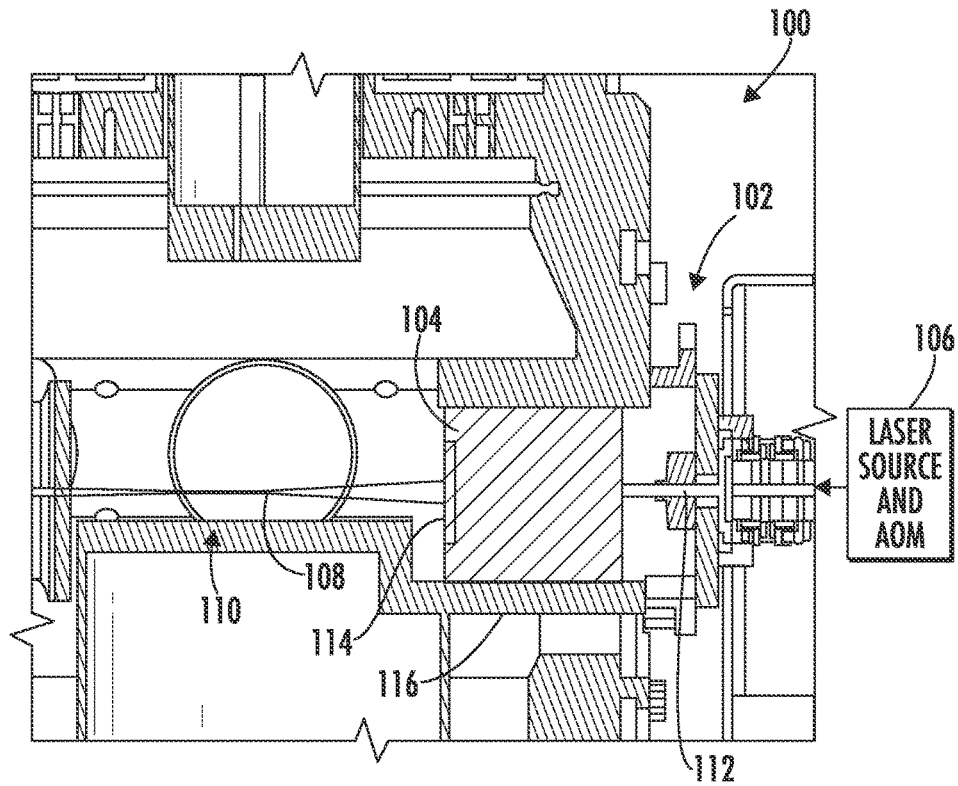
FIG. 1 is a cross sectional view of a portion of a quantum computer including an optical system according to the invention.
Figure 2:
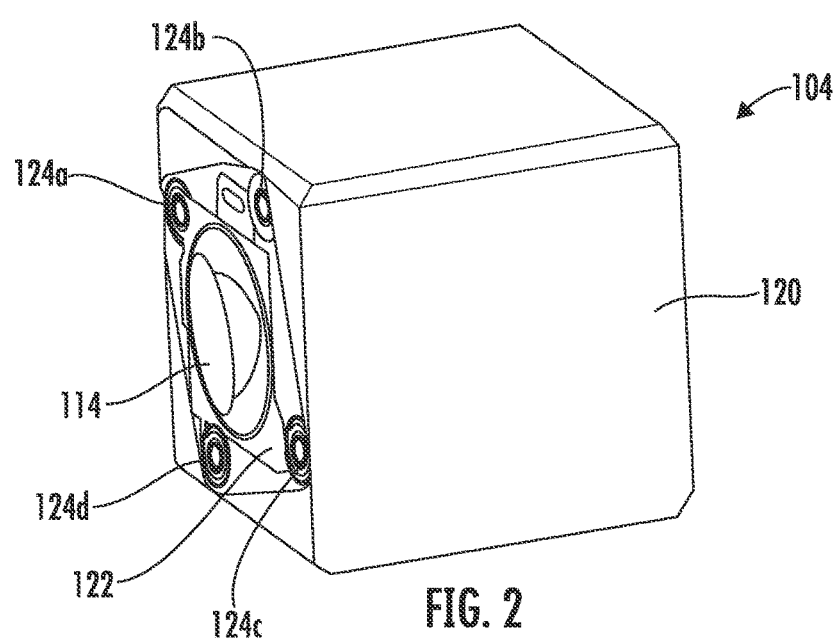
FIG. 2 is a perspective view of the optical assembly of the optical system of FIG. 1.

Referring initially to FIGS. 1 and 2, an optical system is generally designated 102 and is part of a quantum computer 100. The optical system 102 includes an optical assembly 104, a laser source and associated acousto-optic modulator (AOM) 106, and a target in the form of atoms (e.g. ions) 108 within an atom trap 110. An objective lens 114 is aligned between the laser source 106 and the target 108. The optical system 102 satisfies tightly controlled telecentricity, distortion, and spot size requirements. The optical system 102 may also be adapted to fiber-coupling for acousto-optic (AO) devices. The ability to provide fiber-coupled acousto-optic modulators (AOMs) may become increasingly important as the quantum computing industry grows.

Examples of acousto-optic modulator devices and similar acousto-optic systems are disclosed in commonly assigned U.S. Pat. Nos. 9,958,710, 9,958,711, 10,466,516, 10,509,245, 10,495,943, and 10,754,223, the disclosures of which are hereby incorporated by reference in their entireties. Accordingly, the optical system 102 allows operation over a large spectrum. The optical system 102 may accordingly provide advantages with respect to numerous different types of targets.

The optical system 102 may provide five degrees of freedom of movement for adjustment, and comprises a parallel flexure system for final objective lens mounting as described in more detail below. The z-axis is defined in the direction of the laser source 106 to the target 108. The laser source 106 generates a plurality of laser beams 112 that are aimed through the lens 114 to the target 108.

The optical assembly 104 includes a housing 120, a frame 122, the lens 114 carried by the frame 122, and a plurality of spiral flexures 124a, 124b, 124c, 124d, each having a respective proximal end coupled to the frame 122 as shown in FIG. 2. The spiral flexures 124a, 124b, 124c, 124d operate both as pseudo-spherical joints and as prismatic joints. Accordingly, the five degrees of freedom of movement are advantageously managed in a single stage, as opposed to serially in stacked stages, for example. The optical assembly 104 may be cube shaped and have a dimension of approximately 20 millimeters on each side. The optical assembly 104 is space-efficient and may be more tightly integrated with the vacuum chamber 116 than current approaches and can also be adapted to fiber-coupling of acousto-optic devices.

In addition, the spiral flexures 124a, 124b, 124c, 124d have a high effective aspect ratio, allowing for a large adjustment range of Δx, Δy, Δz: ±0.010" (254 μm) and θx, θy: ±5°. A precision of adjustment of the optical assembly 104 is driven in part by the controls design.

Figure 3:
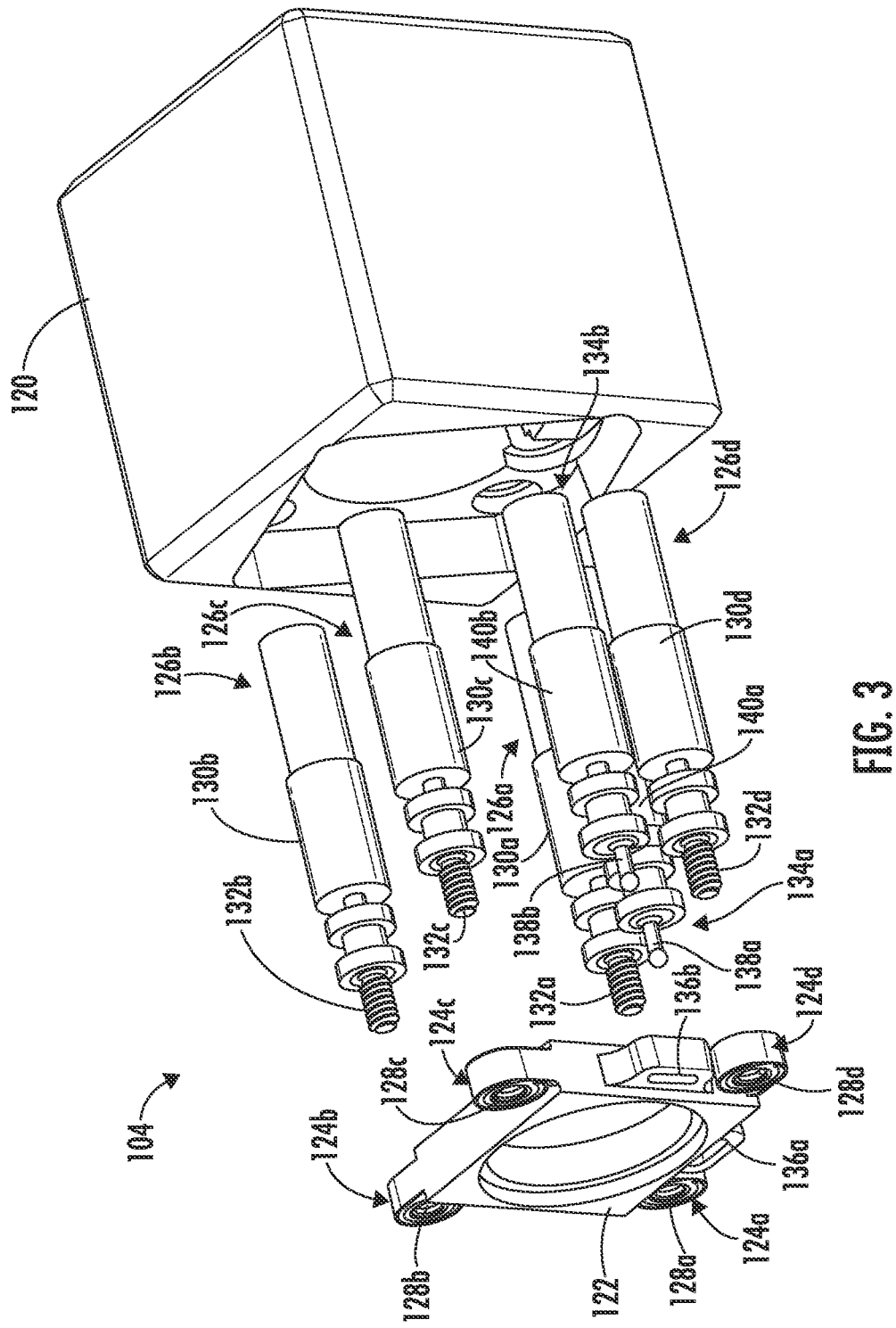
FIG. 3 is an exploded perspective view of the optical assembly of FIG. 2.

Referring now to FIG. 3, the optical assembly 104 features high precision and includes kinematic adjustments for each degree of freedom. In particular, the optical assembly 104 may include a plurality of flexure actuators 126a, 126b, 126c, 126d, where each flexure actuator is coupled between the housing 120 and a distal end of a respective spiral flexure. Each of the flexure actuators 126a, 126b, 126c, 126d may comprise a respective threaded flexure tube 128a, 128b, 128c, 128d coupled to a distal end of each of the plurality of spiral flexures. Each flexure actuator may also comprise a motor 130a, 130b, 130c, 130d having a rotatable threaded output shaft 132a, 132b, 132c, 132d coupled to a respective threaded flexure tube. In some embodiments, the flexure actuators may be carried within the housing 120 as shown in the illustrated embodiment.

The optical assembly 104 may also comprise a plurality of translation actuators 134a, 134b coupled between the housing 120 and the frame 122. For example, the flexure actuators 126a, 126b, 126c, 126d and the translation actuators 134a, 134b are configured to provide the five degrees of freedom (DOF) movement for adjustment of the lens 114.

The frame 122 may include a pair of elongate passageways 136a, 136b orthogonal to one another. Each translation actuator 134a, 134b may comprise a respective motor 140a, 140b having an eccentric output shaft 138a, 138b received within a respective elongate passageway 136a, 136b. Similar to the flexure actuators, the plurality of translation actuators 134a, 134b may also be carried within the housing 120, The frame 122 may have a rectangular shape defining four corners, for example. In this embodiment, the distal end of each of the spiral flexures 124a, 124b, 124c, 124d is coupled to the frame 122 at a respective corner.

Figure 4:
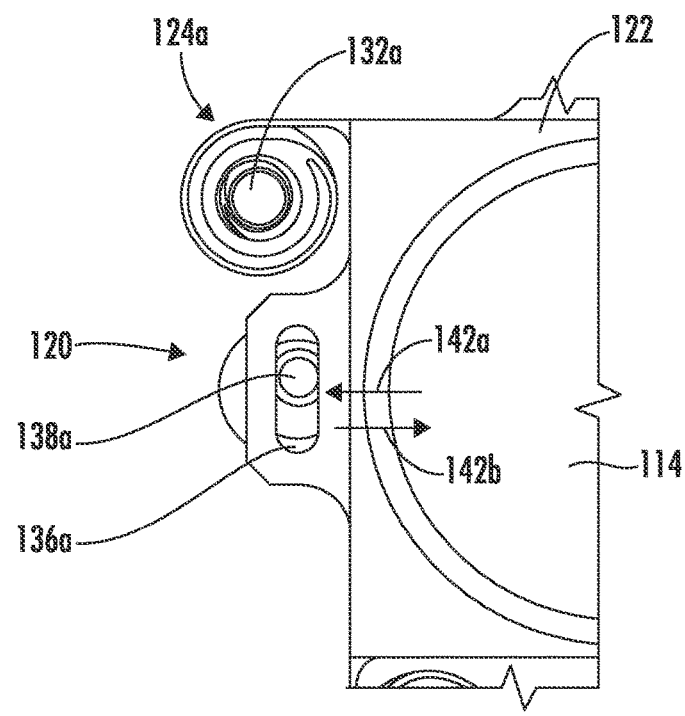
FIG. 4 is a partial top view of the optical assembly of FIG. 2.

Referring now to FIG. 4, the elongate passageway 136a is configured to engage the eccentric output shaft 138a to shift the frame 122 in the directions 142a, 142b along the x-axis. For example, in operation the frame 122 is configured to move in the direction 142a as the eccentric output shaft 138a rotates counter-clockwise. In a similar manner, the frame is configured to move in the direction 142b as the eccentric output shaft 138b rotates in the opposing clockwise direction. As those of ordinary skill in the art can appreciate, the frame 122 can similarly be adjusted along the y-axis.

Figure 5:
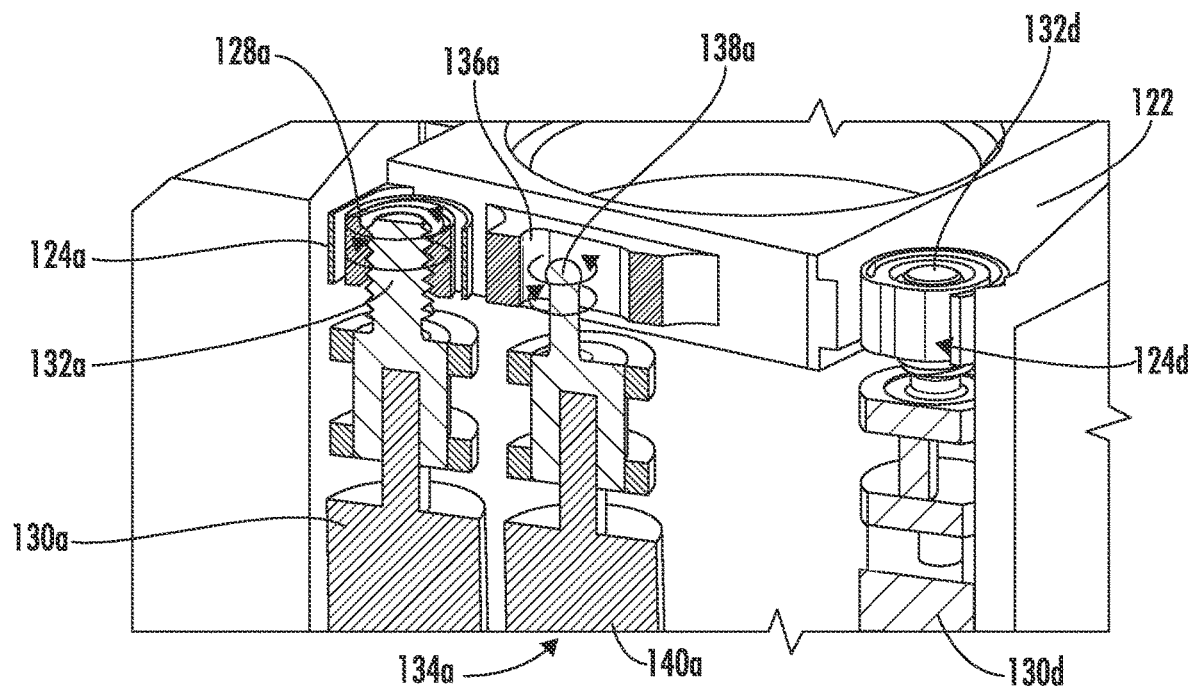
FIG. 5 is a fragmentary view of the optical assembly of FIG. 2.

With additional reference to FIG. 5, the eccentric output shaft 138 is offset from the center of the translation actuator 134a. Accordingly, the eccentric output shaft 138 is configured to move in one of the directions 142a, 142b and consequently moves the frame. 122 and lens 114 in the desired direction as the motor 140a rotates.

The spiral flexure 124a is also shown in a partial cross-sectional view in FIG. 5, The respective corner of the frame, 122 is raised or lowered dependent on the direction the threaded output shaft 132a is rotated by the motor 130a. In a particular aspect, the threaded flexure tube 128a rides upwards on the threaded output shaft 132a and away from the housing 122 as the threaded output shaft 132a is rotated in the counter-clockwise direction. As the threaded output shaft 132a is rotated in the clockwise direction, the threaded flexure tube 128a rides down on the threaded output shaft 132a and towards the housing 122. The result of raising or lowering the spiral flexure 124a is to cause the frame 122 and lens 114 to be, adjusted. As those of ordinary skill in the art can appreciate, the direction of rotation and threading of the threaded flexure tube 128a and output shaft 132 could be reversed to operate similarly.

Figure 6:
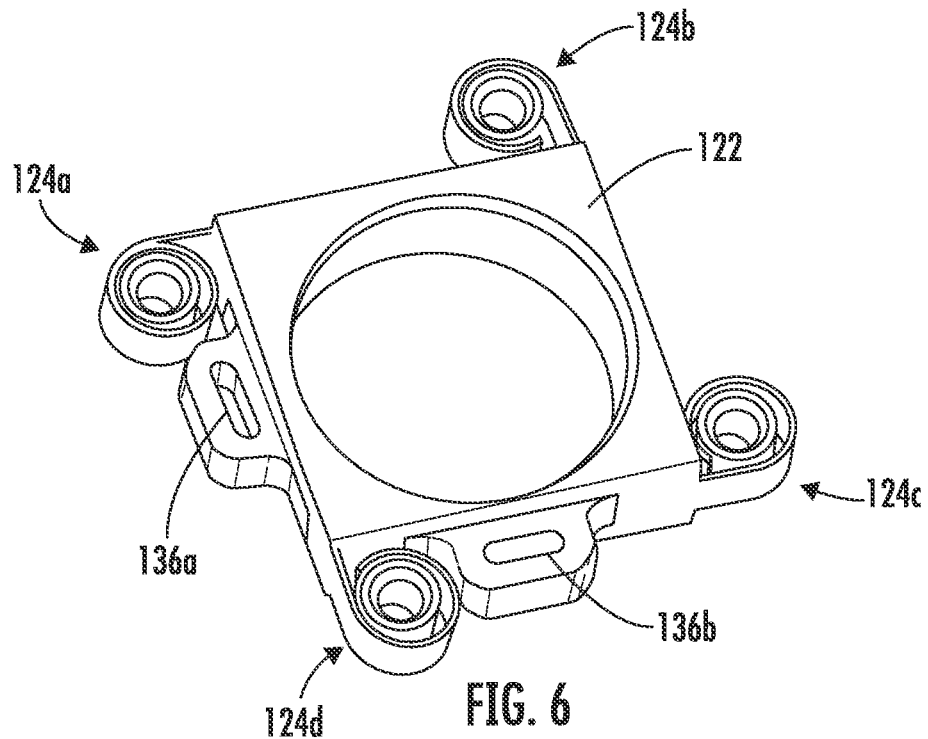
FIG. 6 is a perspective view of a frame of the optical assembly of FIG. 2.
Figure 7:
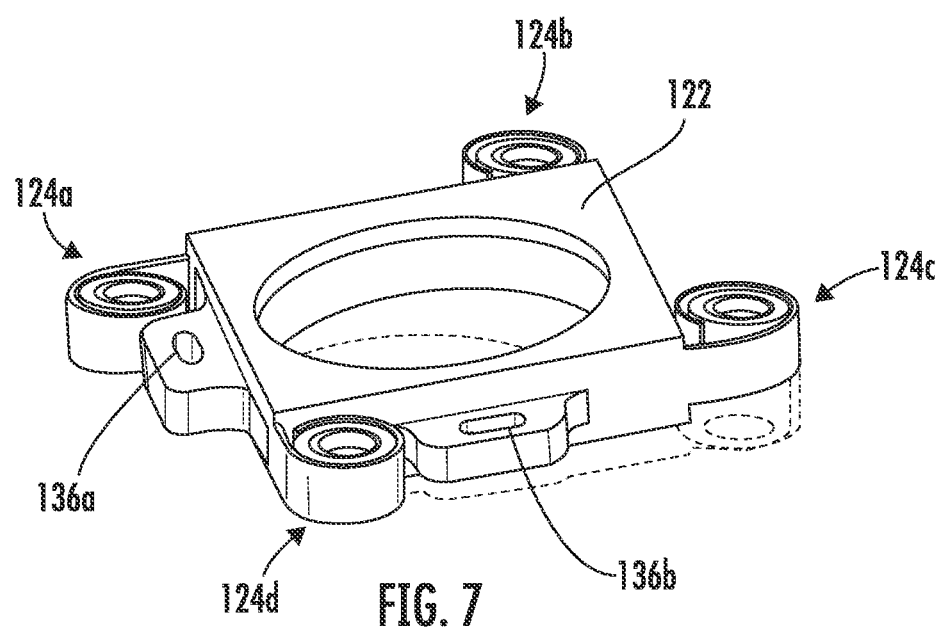
FIG. 7 is a perspective view of the frame of the optical assembly of FIG. 2 with the objective lens being adjusted via the spiral flexure.

The frame 122 is illustrated in FIG. 6 without the lens 114 or the spiral or translation actuators. As explained above, the frame 122 combines five degrees of freedom of movement into one stage. The focus of the lens 114 is adjusted by actuating one or more of the spiral flexures 124a, 124b, 124c, 124d. For example, as spiral flexure 124c is raised as illustrated in FIG. 7, the frame 122 moves accordingly to adjust the focus of the lens 114. As those of ordinary skill in the art can appreciate, the frame 122 and consequently the lens 114 can be adjusted in the Δz, θx, θy directions using the spiral flexures 124a, 124b, 124c, 124d alone or in combination with each other.

Typically, the alignment of the lens 114 would require three to five stages in series to achieve the alignment of the lens 114. However, the frame 122 achieves synergistic travel and moves similar to a Gough-Stewart platform discussed above. Linearity is driven by force balance among the spiral flexures, not kinematics, and having a relatively high specific stiffness (stiffness per unit mass). In addition, the spiral flexures 124a, 124b, 124c, 124d allow for relatively large adjustment range in both translation and rotation while efficiently distributing stress. In addition, the spiral flexures 124a, 124b, 124c, 124d have a unique aspect ratio and may desirably have a specific stiffness due to being almost a full diameter in thickness.

Figure 8:
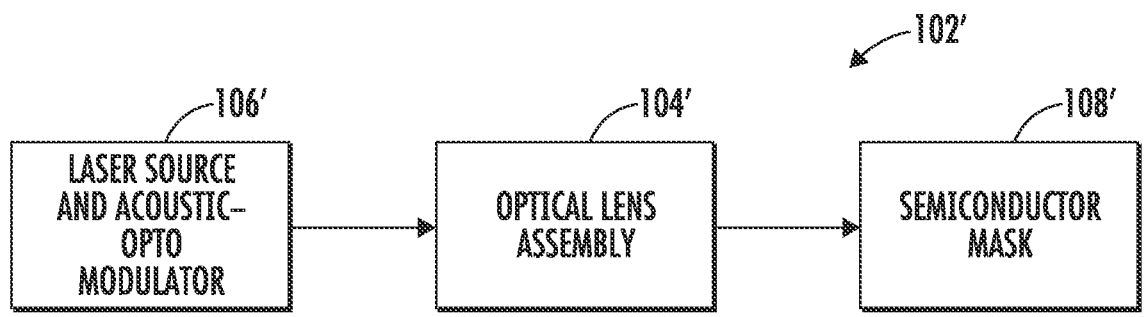
FIG. 8 is a block diagram of an optical system where the target is a semiconductor mask according to the invention.

With reference to FIG. 8, the optical system 102' may be used in an application where the target comprises a semiconductor mask 108'. The laser source 106' is directed to the semiconductor mask 108' with the optical lens assembly 104' therebetween.

Figure 9:
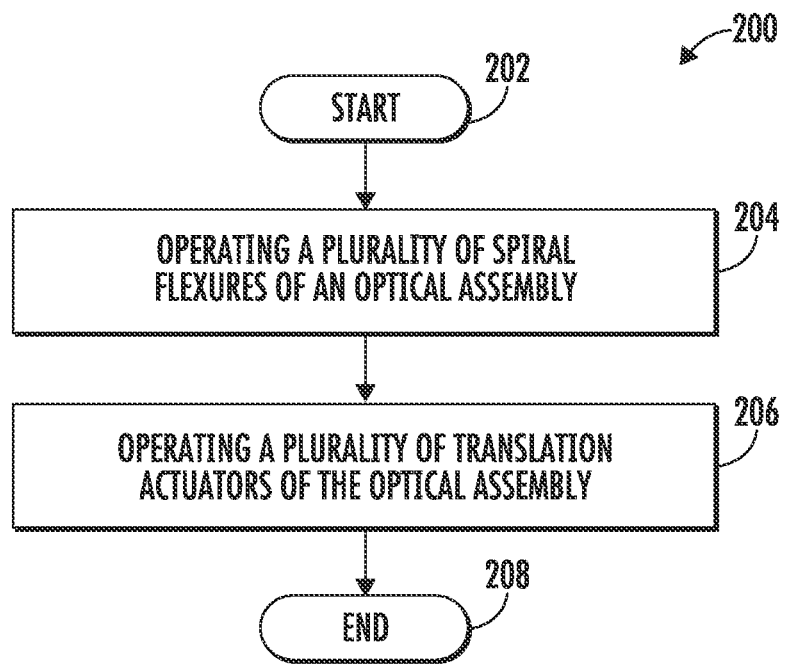
FIG. 9 is a flowchart of a method of operating the optical system of FIG. 1.

Referring now to the flowchart 200 of FIG. 9, in accordance with another aspect, is a method of steering a laser beam from a laser source to a target within a vacuum chamber. The method may include operating a plurality of flexure actuators of an optical assembly within the vacuum chamber between the target and the laser source. The optical assembly may comprise a housing, a frame, a lens carried by the frame, and a plurality of spiral flexures each having a respective proximal end coupled to the frame. The optical assembly may also have a plurality of flexure actuators with each flexure actuator coupled between the housing and a distal end of a respective spiral flexure. In addition, the optical assembly may include a plurality of translation actuators where the flexure actuators and the translation actuators provide five degrees of freedom (DOF) of movement for adjustment of the lens.

From the start at Block 202, the method 200 includes operating the plurality of spiral flexure actuators of the optical assembly to adjust an angle of the lens, at Block 204, where a respective threaded flexure tube is coupled to a distal end of each of the plurality spiral flexures, and each flexure actuator comprises a motor having a rotatable threaded output shaft coupled to a respective threaded flexure tube. Moving to Block 206, the method includes operating a plurality of translation actuators of the optical assembly to adjust a translation of the lens, where each translation actuator comprises a motor having an eccentric output shaft received within a respective elongate passageway of the frame carrying the lens. The method ends at Block 208.

Many modifications and other embodiments of the invention will come the mind of one skilled in the art having the benefit of the teachings presented in the foregoing descriptions and the associated drawings. Therefore, it understood that the invention is not to be limited to the specific embodiments disclosed, and that modifications and embodiments are intended to be included within the scope of the appended claims.

That which is claimed is:

1. An optical system for use with a vacuum chamber comprising:
   a target to be positioned within the vacuum chamber;
   a laser source; and
   an optical assembly to be positioned within the vacuum chamber between the target and the laser source, the optical assembly comprising
      a housing,
      a frame orientated within a spatial plane,
      a lens carried by the frame,
      a plurality of spiral flexures each winding around a respective distal end and having a respective proximal end coupled to the frame in the same spatial plane, and
      a plurality of flexure actuators, each flexure actuator coupled to the respective distal end at a center portion of a respective spiral flexure.

2. The optical system of claim 1 wherein the optical assembly comprises a respective threaded flexure tube coupled to a distal end of each of the plurality of spiral flexures; and wherein each flexure actuator comprises a motor having a rotatable threaded output shaft coupled to a respective threaded flexure tube.

3. The optical system of claim 1 wherein the plurality of flexure actuators is carried within the housing.

4. The optical system of claim 1 wherein the optical assembly comprises a plurality of translation actuators coupled between the housing and the frame.

5. The optical system of claim 4 wherein the plurality of flexure actuators and the plurality of translation actuators are configured to provide five degrees of freedom (DOF) movement for adjustment of the lens.

6. The optical system of claim 4 wherein the frame includes a pair of elongate passageways orthogonal to one another; and wherein each translation actuator comprises a motor having an eccentric output shaft received within a respective elongate passageway.

7. The optical system of claim 4 wherein the plurality of translation actuators is carried within the housing.

8. The optical system of claim 1 wherein the frame has a rectangular shape defining four corners; and wherein the proximal end of each spiral flexure is coupled to the frame at a respective corner.

9. The optical system of claim 1 wherein the target comprises an atom trap.

10. The optical system of claim 1 wherein the target comprises a semiconductor mask.

* * * * *